O. G. PFEIFFER.
CLUTCH.
APPLICATION FILED NOV. 20, 1911.
1,153,853.
Patented Sept. 14, 1915.
2 SHEETS—SHEET 2.
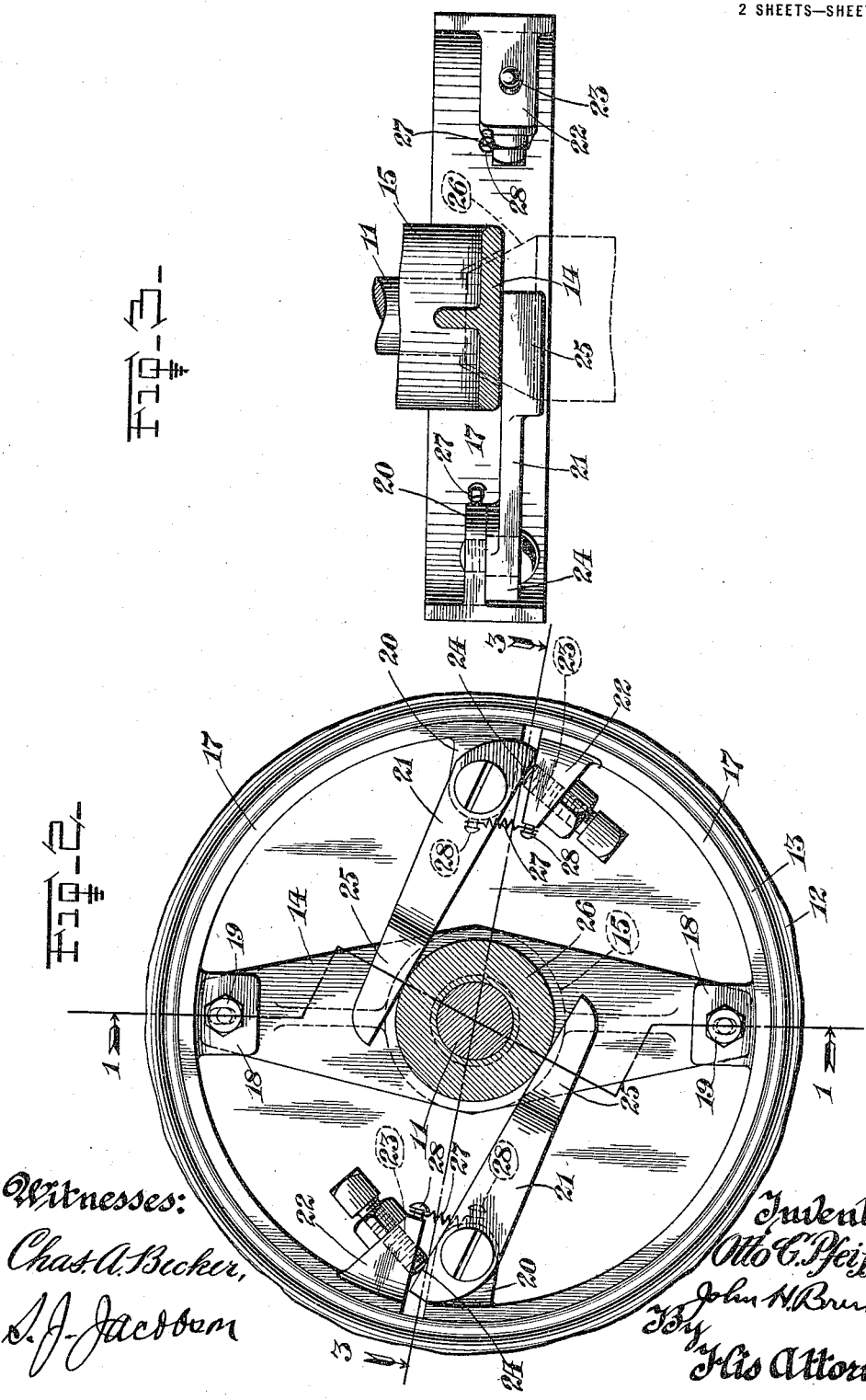

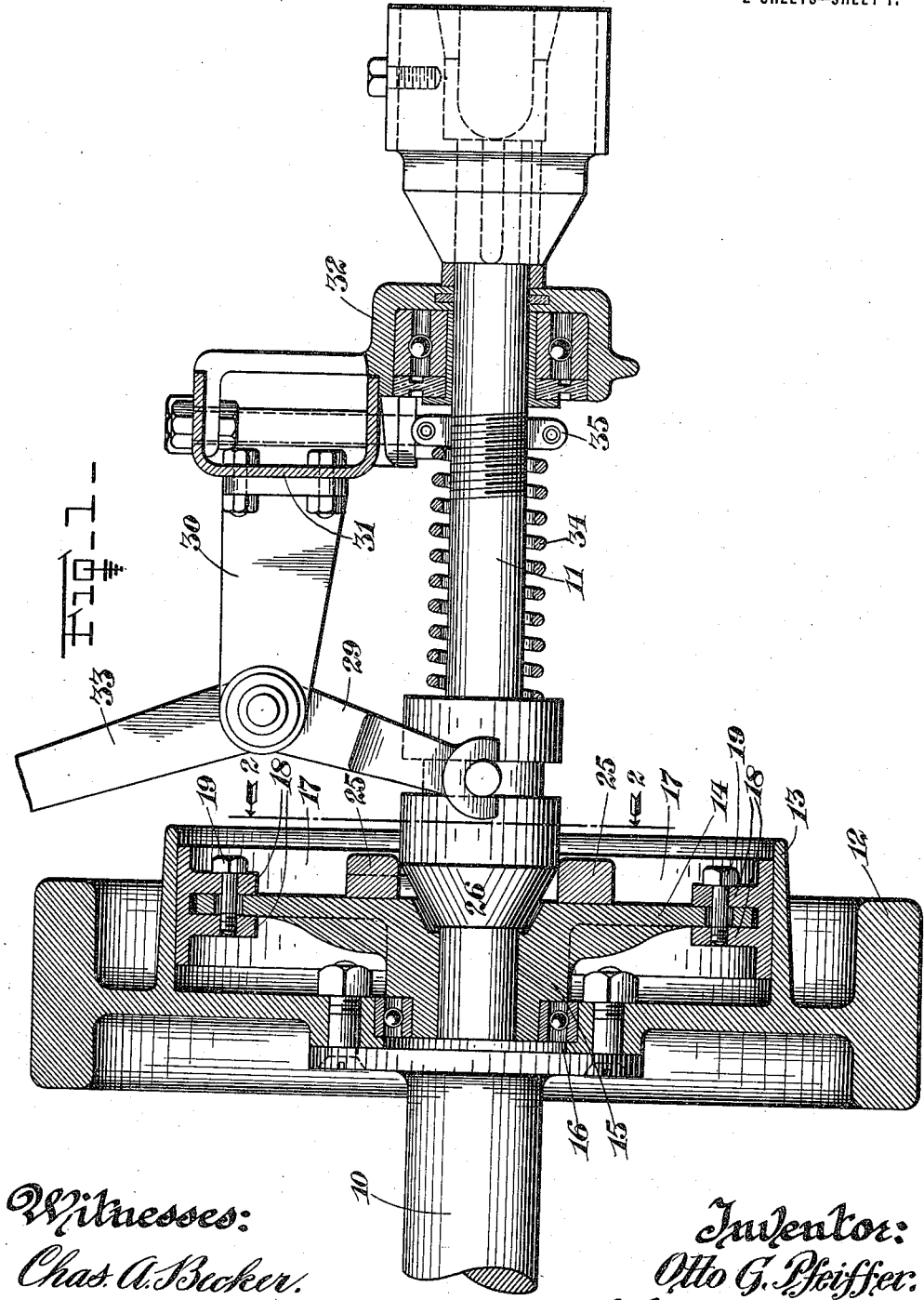

UNITED STATES PATENT OFFICE.

OTTO G. PFEIFFER, OF SALT LAKE CITY, UTAH, ASSIGNOR TO UTAHNA DEVELOPMENT COMPANY, OF SALT LAKE CITY, UTAH, A CORPORATION OF UTAH.

CLUTCH.

1,153,853.  Specification of Letters Patent.  Patented Sept. 14, 1915.

Application filed November 20, 1911. Serial No. 661,384.

*To all whom it may concern:*

Be it known that I, OTTO G. PFEIFFER, a citizen of the United States, and residing at Salt Lake City, in the county of Salt Lake and State of Utah, have invented certain new and useful Improvements in Clutches, of which the following is a specification.

This invention relates to clutches and more particularly to clutches of the drum and expanding band or ring type.

In clutches of the expanding band or ring type, as heretofore constructed, the band shoe is pivoted at a fixed point with respect to the spider or clutch member carrying it. In expanding such a clutch the free end of the band is moved to expand the band to throw it into gripping engagement with the cylindrical surface on the drum. It is found however that with such a construction the arc of contact between the band and the drum will not include the entire circumferential surface of the band, in view of the fact that the end of the band is fixed radially and cannot move freely into frictional engagement with the drum. It is thus found that the gripping engagement will be a maximum at the free ends of the band and will decrease as we proceed toward the point of attachment of the band to its carrying spider. This construction obviously reduces the frictional arc of contact very much and therefore reduces the capacity of the clutch requiring a much greater gripping surface than if the gripping engagement or arc would extend along the entire circumferential surfaces of the band and drum. Such a construction also causes the free end to engage suddenly, thereby applying the power with a jerk and preventing a gradual engagement or closing of the clutch, which is desirable especially in motor vehicles.

The objects of this invention are therefore to construct a clutch in which the band will grip the drum along the entire circumferential surface of the band and in which the gripping arc will extend uniformly for practically 360°; and which is so constructed that it can be engaged gradually.

Further objects are to improve the clutch as to details, and further objects will appear from the detail description taken in connection with the accompanying drawings in which:

Figure 1 is a longitudinal section along the line 1—1 Fig. 2, Fig. 2 is a section on the line 2—2 Fig. 1 showing the clutch mechanism in elevation, and Fig. 3 is a section on the line 3—3 Fig. 2.

Referring to the accompanying drawings, 10 and 11 designate shafts either of which may be the driving or driven shaft. In the specific construction shown the clutch is shown as applied to a motor vehicle, in which 10 will form the motor crank shaft supporting the fly wheel 12, and 11 the driven shaft connected to the usual change speed gearing. The fly wheel web has cast thereon the clutch drum 13 which is machined to furnish an inside friction surface. A spider 14 is keyed to the end of shaft 11 and has its hub 15 supported in the fly wheel through a ball bearing 16. The clutch band or ring engaging the inner surface of the drum comprises two similar shoes 17 each provided near its center with spaced lugs 18 embracing the free ends of the spider arms. Bolts 19 pass through the ears and through slots in the ends of the arms, so that each shoe will be supported between its ends on the spider for a limited outward and inward movement at its point of attachment toward and from the drum surface. One free end of each shoe is provided with a lug 20 forming a bearing for a lever 21 which is pivoted to the lug by a screw as shown. The other free end of each shoe is provided with a lug 22 receiving an adjusting screw 23, and each of the levers 21 is provided with a toe 24 adapted to engage the end of the screw 23. Each lever 21 is provided with a laterally extending rounded end 25 adapted to be engaged by a cone sleeve 26 loosely mounted upon the shaft 11.

The clutch is expanded by moving the cone sleeve to the left Fig. 1, thereby causing it to swing the levers 21 and spread the ends of the shoes 17 apart by the engagement of the toes 24 with the screws 23. When the cone sleeve is moved to the right the levers 21 will be released so as to permit the shoes to contract and move away from the drum. In order however that this contracting movement be made more positive, springs 27 connect the lugs 20 and 22 through screws or pins 28, so that when the levers 21 are released by the cone sleeve the springs will act to positively contract the clutch band.

The cone sleeve 26 may be operated to engage and disengage the clutch in any suitable manner. In the specific construction shown a shifting fork 29 is mounted on a bracket 30 carried by a cross member 31 of the motor vehicle chassis, which cross member also carries the bearing 32 for the shaft 11. The shifting fork is operated through the usual clutch pedal 33 to release the clutch, while the clutch is thrown into engagement by a spring 34 on the shaft 11 bearing at one end against the coned sleeve 26 and at its other end against the adjustable sleeve 35.

It will be noted that the shoes 17 are supported between their ends on the spider 14 and that they are mounted for free movement at their points of attachment to the spider arms toward and from the friction surface of the drum 13. When the arms 21 are swung outwardly, the free ends of the shoes are spread apart. With this construction the shoes 17 will be moved into engagement with the friction surface of the drum when they are spread apart, and this engagement will take place along the entire circumferential surfaces of the shoes, and furthermore the engagement will take place equally and uniformly all along the shoes at their points of attachment to the spider as well as at their free ends. The combined sliding and pivotal mounting of the shoes at their points of support permits free movement of these shoes at their points of support toward and from the inside surface of the drum. It will be noted that the lever 21 is pivoted on the free end of a shoe and engages a screw on the abutting free end of the other shoe, and that this lever has a loose connection with the actuator cone 26. The free ends of the shoes can therefore move independently toward and from the drum and also slightly circumferentially of the drum. This construction permits the clutch shoes to automatically adjust themselves to the inside surface of the drum, for if the resistance offered by one shoe end is less than that of the adjacent shoe, so that one will engage the friction surface before the other, the former shoe will become in turn an abutment for the lever 21 to cause the other shoe to be thrown into frictional engagement. The connection between the actuator cone and the free ends of the clutch shoes is therefore such as to equalize the movements of these shoes into engagement with the drum and cause them to bear equally thereon. The clutch shoes will therefore bear uniformly against the drum surface along the entire lengths of the shoes. It will therefore be seen that the arc of contact will be nearly and substantially 360°. This construction therefore results in high efficiency and low weight in view of the fact that the total friction surfaces are fully utilized. When the clutch shoes are thrown into engagement with the drum, the engagement will take place first at the center of the shoes, or if at the ends, the engagement will be substantially uniform at both ends. It is found therefore that the engagement of the clutch can be made gradually to gradually apply the power. This is not possible with a construction in which one end only of the band engages first, since such a construction will cause the engagement of the remaining portion with a "slap", thereby applying the power with a jerk. The levers 21 bear against the arms 14 and thus these arms will take up the thrust of the cone sleeve 26.

While the clutch is shown as applied to a motor vehicle, it is obvious that its application is not necessarily limited to that class of drive, but its application may be general. It is further obvious that various changes may be made in the details of construction without departing from this invention, and it is therefore to be understood that this invention is not to be limited to the specific construction shown and described.

The invention is claimed broadly in my copending application Serial Number 779,010, filed July 14, 1913.

Having thus described the invention what is claimed is:

1. In a clutch, a pair of clutch members, one of said clutch members having an inside friction surface, a pair of flexible band shoes adapted to expand and engage said friction surface, means for supporting said shoes intermediate their ends on the other clutch member, constructed to permit free movement of said shoes at their points of support toward and from said friction surface, an arm pivoted on the free end of each shoe and loosely engaging the adjacent end of the other shoe, and an actuator loosely engaging said arms, whereby said actuator is loosely connected to the free ends of said shoes for expanding and moving them uniformly along their entire lengths radially toward said friction surface, and said parts being constructed and arranged to equalize the movements of said shoes into engagement with said friction surface and cause them to bear equally on said friction surface.

2. In a clutch, a pair of clutch members, a friction drum on one of said members, a band shoe adapted to expand and frictionally engage the inside surface of said drum, an arm on the other clutch member, means for supporting said shoe between its ends on said arm, a lever mounted on one of the free ends of said shoe and bearing against said arm, and a cam member for operating said lever, whereby said arm supports said lever against the thrust of said operating cam member.

3. In a clutch, a pair of clutch members, a friction drum on one of said members, a plurality of band shoes forming together a band or ring and adapted to expand and frictionally engage the inside surface of said drum, arms on the other clutch member, means for supporting said shoes between their ends on said arms, levers mounted on the free ends of said shoes and bearing, at their free ends, against said arms, and means for operating said levers.

In testimony whereof I affix my signature in presence of two witnesses.

OTTO G. PFEIFFER.

Witnesses:
J. H. BRUNINGA,
A. H. ALMSTEDT.

Copies of this patent may be obtained for five cents each, by addressing the "Commissioner of Patents, Washington, D. C."